Dec. 14, 1926.

H. E. McKEE 1,610,695

PIPE FITTINGS FINISHING MACHINE

Filed Oct. 31, 1924    4 Sheets-Sheet 1

INVENTOR
Harry E. McKee
BY
Charles L. Wright.
ATTORNEY

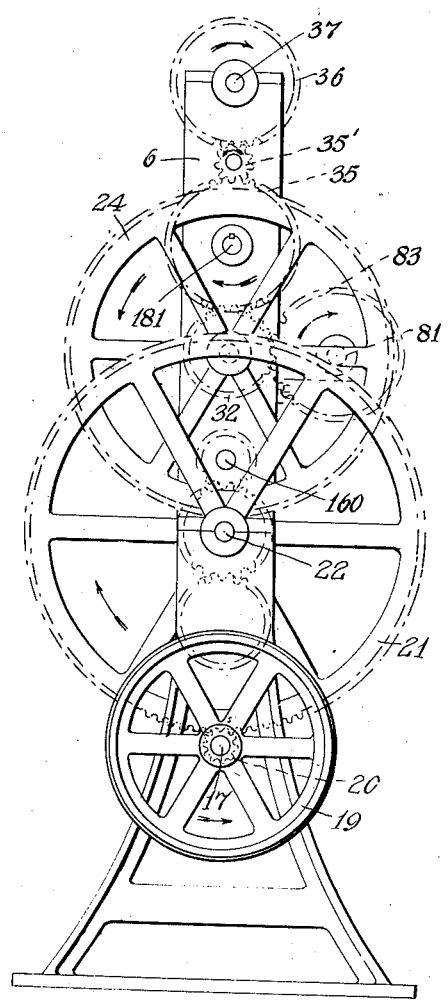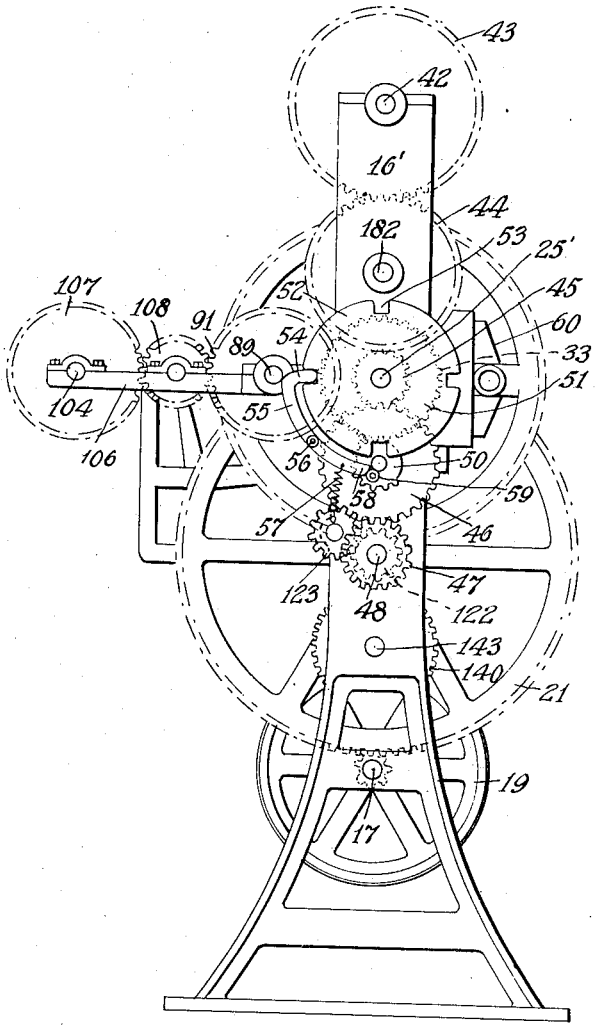

Dec. 14, 1926.
H. E. McKEE
1,610,695
PIPE FITTINGS FINISHING MACHINE
Filed Oct. 31, 1924     4 Sheets-Sheet 3
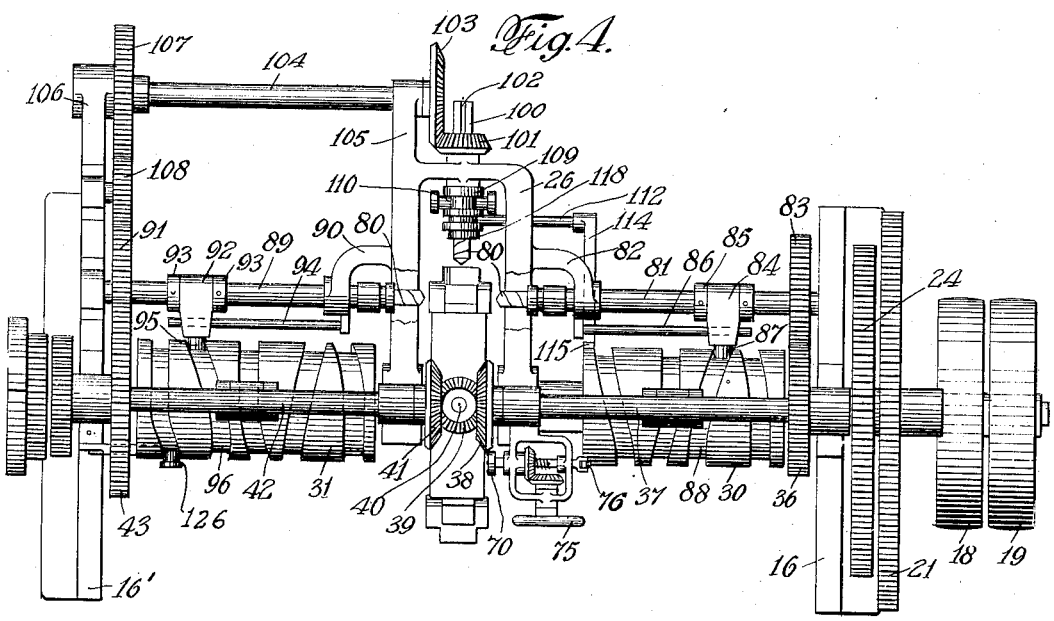
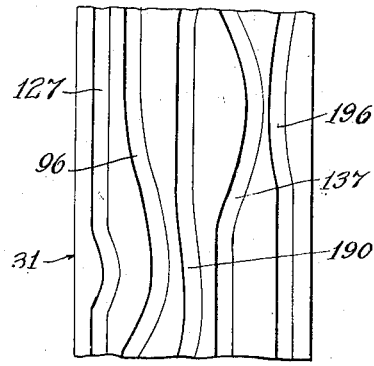
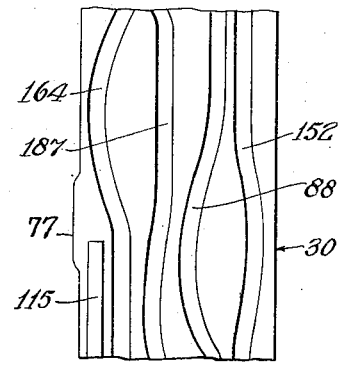
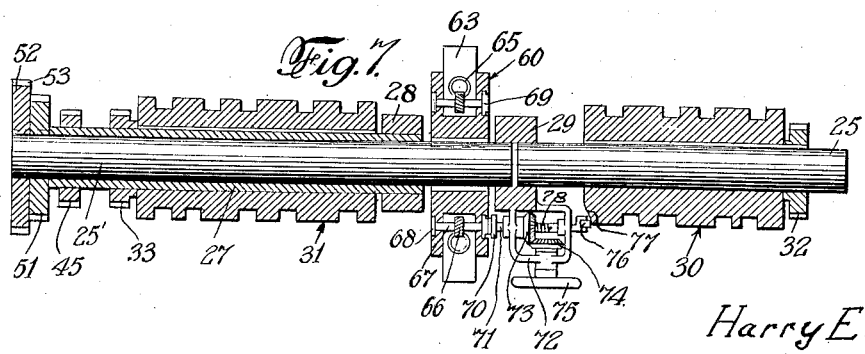
INVENTOR
*Harry E. McKee*
BY
*Charles L. Wright*
ATTORNEY Dec. 14, 1926.
H. E. McKEE
1,610,695
PIPE FITTINGS FINISHING MACHINE
Filed Oct. 31 1924   4 Sheets-Sheet 4
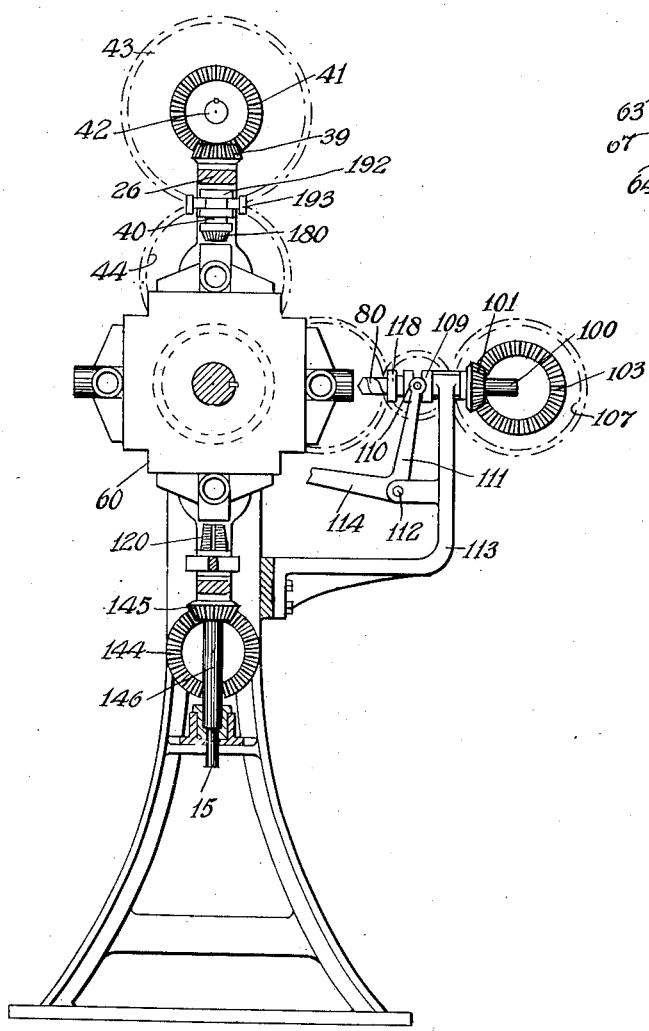
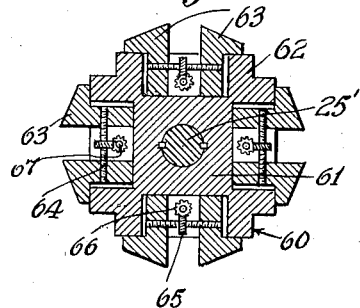
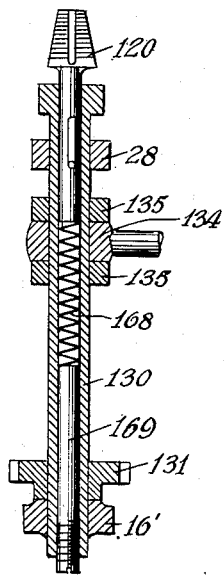
INVENTOR
Harry E. McKee
BY
Charles L. Wright
ATTORNEY Patented Dec. 14, 1926.

1,610,695

UNITED STATES PATENT OFFICE.

HARRY E. McKEE, OF BROOKLYN, NEW YORK.

PIPE-FITTINGS-FINISHING MACHINE.

Application filed October 31, 1924. Serial No. 746,948.

This invention relates to machines for drilling facing, tapping, and counter-boring pipe fitting such as T's, elbows, crosses and the like, including valve bodies.

One of the objects of the invention is to provide a machine having a plurality of power driven spindles, cam actuated and timed in proper sequence to perform several operations upon a work part or parts, held in a chuck or holder automatically actuated in timed relation with the tool carrying spindles.

Another purpose is to produce a machine in which the several outlets of the fittings held in the chuck or holder may be bored or reamed to produce a cylindrical opening of proper diameter for the introduction of a screw thread cutter or tap, thereafter being faced in a plane at a right angle to the axis of the bore and finally counter-bored so that the outer threads will be presented to an entering pipe in the best possible condition.

A further aim is in the provision of a machine which is essentially automatic in its operation, requiring only that the chuck or holder be supplied with the work parts at one stage in its rotation, or rather that unfinished parts be substituted for those which have undergone the several operations.

A still further feature of the invention is to provide an improved machine by which an increased quantity of work parts may be produced, and in the machining of such work parts in a superior manner with respect to accuracy, completeness of finish and in an extremely rapid manner.

These and other analogous aims and objects are accomplished by the novel construction and combination of parts hereinafter described and shown in the accompanying drawings, forming a material part of this disclosure, and in which,—

Figure 2 is an end view of the same looking from the right hand or driving end of the machine.

Figure 3 is a similar end view of the machine looking from the opposite end.

Figure 4 is a plan view of the machine.

Figure 5 is a development of the cams on the left hand of the machine.

Figure 6 is a similar view of the cams on the right hand end.

Figure 7 is a longitudinal view in section of the main shaft and its associated parts.

Figure 8 is a vertical sectional view taken on line 8—8 of Fig. 1.

Figure 9 is a transverse sectional view of the chuck.

Figure 10 is a longitudinal sectional view of one of the tap carrying spindles, showing the resilient pressure means employed.

Figure 1:
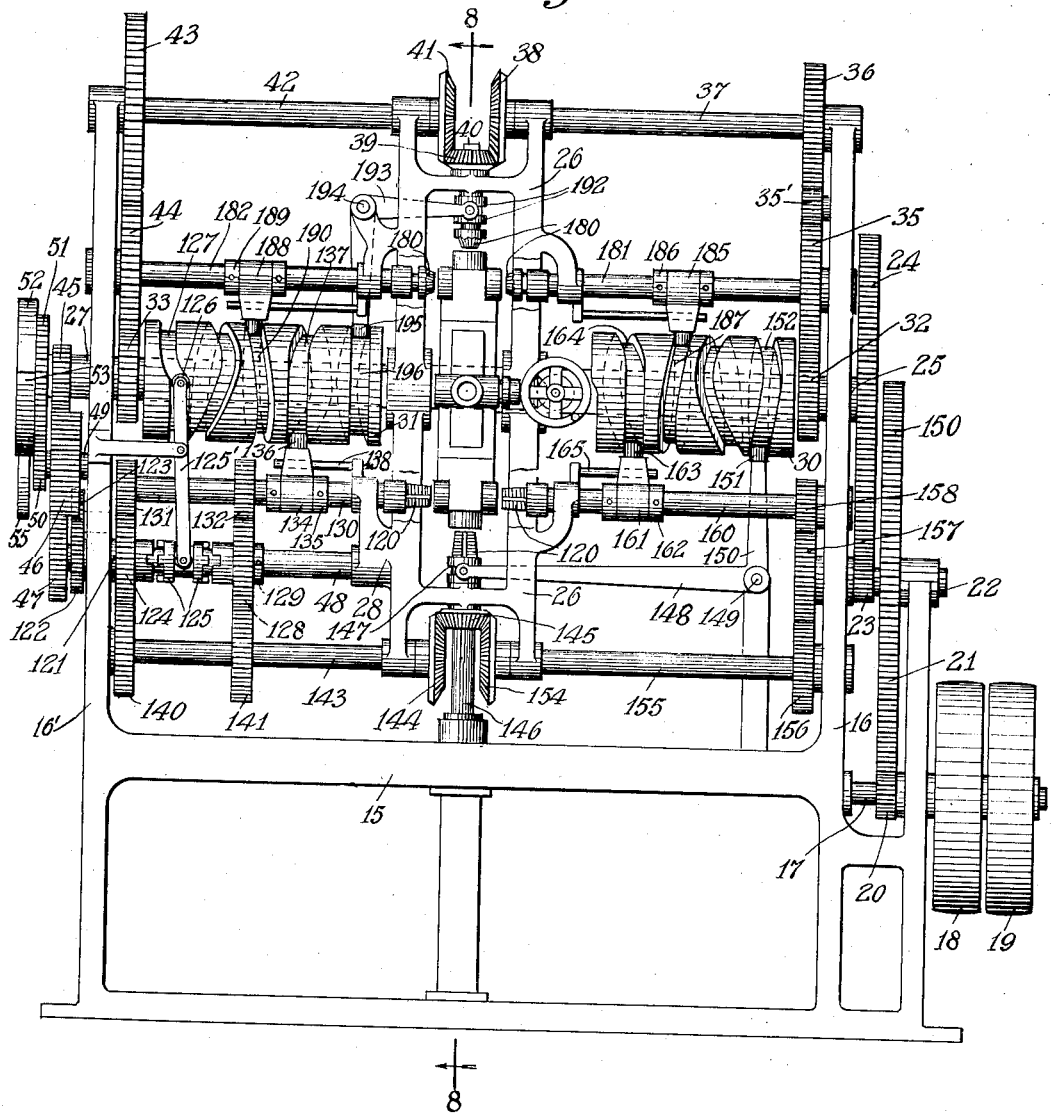
Figure 1 is a front elevational view of a machine constructed in accordance with the invention.

The machine is mounted upon a bedframe, generally designated by the numeral 15; the uprights or standards 16 and 16' respectively at the right and left hand ends, are provided with suitable bearings for the journals of the various driving and operating spindles for the drilling, facing, tapping and countersinking tools used.

A drive shaft 17, housed at the right hand end of the machine, is driven by means of a customary transmission belt trained over the tight and loose pulleys 18 and 19, and fixed on the shaft is a spur pinion 20 in mesh with a large gear 21 on a short shaft 22 journalled in bearings forming part of the machine frame upright 16.

The shaft 22 carries a pinion 23 in mesh with a spur gear 24 on the outer end of a sectional shaft 25, extending through the upright 16 into the machine, the inner end of the shaft abutting the longer section 25' within one of the bearings of a bracket 26 arranged vertically at the center of the machine, the shaft section 25' being rotatably mounted in a sleeve 27, journalled in the mating bearing 28, the shaft extending outward beyond the machine upright 16', as best seen in Figure 1.

Fixed on the shaft section 25 and sleeve 27 respectively, are cam cylinders 30 and 31, which for reasons further on apparent, must be rotated in unison; to accomplish this a spur gear 32 is secured to the shaft section 25 adjacent the upright 16 and a similar gear 33 is fixed on the outer portion of the sleeve 27. Meshing with the gear 32 is a gear 35 transmitting motion by means of an idle pinion 35' to another gear 36 fixed on a spindle 37, rotatably mounted in bearings at the upper ends of the upright 16 and bracket 26 and having fixed on its inner end a bevel gear 38, the same meshing with a bevel pinion 39 fixed on the end of a vertical spindle 40, which will be further on described.

The pinion 39 is also in mesh with a bevel gear 41, facing the gear 38 and being in all respects similar to it.

The gear 41 is fixed on the inner end of a spindle 42 rotatably mounted in bearings at the opposite end of the machine, in alinement with the spindle 37, and on the spindle 42, adjacent the upright 16', is fixed a spur gear 43 meshing with another gear 44 which is also in mesh with the pinion 33 secured to the sleeve 27.

From the foregoing it will be understood that the cam cylinders 30 and 31 are rotated in the same direction and at the same uniform speed.

Fixed on the extending end of the sleeve 27 is a spur pinion 45 meshing with a wide faced gear 46 in mesh with a spur gear 47 fixed on the extending end of a shaft 48 journalled in the frame upright 16' and bracket 28.

The idle gear 46 is rotatable on a stud 49 fixed in the upright 16' and secured alongside the gear 46 is a spur pinion 50 in mesh with a gear 51 rotatable on the extending end of the shaft section 25', and having on its outer side a disc 52 held in frictional engagement.

The disc 52, (see Figs. 1 and 3) which is fixed on the outer end of the shaft section 25', has four equally spaced notches 53 in its periphery and adapted to engage therein is a detent 54 formed on the end of a curved lever 55, pivoted at 56 to the frame of the machine and normally drawn into engagement by a coiled tensional spring 57.

The cam-shaped, opposite end 58 of the lever 55 is actuated periodically by contact with a stud 59 set in the side of the pinion 50 in such manner as to withdraw the detent and permit the disc to make a quarter turn, due to its frictional engagement with the constantly rotating gear 51, so that the disc and consequently the shaft section 25' are rotated in unison.

A four jawed chuck or work-holder, generally designated by the numeral 60, is composed of a center block 61, keyed to the shaft section 25', between the bearings 26 and 28, at the center of the machine.

The chuck extensions 62 are recessed to carry pairs of opposed gripping jaws 63, actuated by right and left hand screws 64 having fixed at their centers helically toothed gears 65, in engagement with mating gears 66, fixed on short spindles 67, these spindles having discs 68 at one end and clutch elements 69 on their opposite ends.

Engageable with the clutch elements 69 is a mating clutch element 70 fixed on the end of a spindle 71 rotatable in a frame 72, secured to the bracket 26 and having on it a bevel gear 73 meshed with a mating gear 74, actuated by a hand wheel 75 mounted in the frame.

A forked projection on the spindle 71 carries a roll 76 to engage a cam 77 on the end of the cylinder 30 this cam controlling the clutch 70 which enables the jaws of the chuck to be opened or closed, a spring 78 normally holding the clutch elements out of engagement.

It will now be understood that as the chuck 60 is periodically rotated a quarter turn and held rigidly by engagement of the detent with the disc 52 at all other times, one of the pair of jaws 63 will be brought into position to be opened and a work-part substituted for another that has been completely machined.

It is also to be understood that on account of the cam 77, one pair of the jaws can only be operated when in one position of the chuck and that this position corresponds with the initial locking of the disc, at which time also the several tools are moved into operative relation with the work parts carried by the remaining jaws.

The operation of drilling will now be described: This is accomplished by the drills 80, three of which are used, one at the rear, see Figure 4, and one each respectively at the right and left hand of the machine, in a plane corresponding to the center of the cam cylinders, thus simultaneously drilling all of the several holes in a three-way T as indicated.

The right hand drill is secured in a spindle 81, revoluble and slidable in bearings formed on the upright 16 and an arm 82 of the bracket 26, the spindle being rotated by the gear 83, in mesh with the gear 32, and the spindle is moved lengthwise by an arm 84 in the hub of which the spindle rotates between collars 85 secured to the spindle.

The arm 84 is prevented from rotating by a bar 86, and carries a roller 87 at its end engaging in the cam groove 88 of the cylinder 30.

The left hand drill is secured in a similar spindle 89 slidable and rotatable in bearings in the upright 16' and bracket 90 being driven by a gear 91 in mesh with the gear 33, and is moved towards and from the workpart by an arm 92 on the spindle between collars 93, the arm sliding on a bar 94, and carrying a roller 95 engaging the cam groove 96 in the cylinder 31.

The rear drill is secured in a spindle 100 mounted in an extension of the bracket 26, and is driven by a bevel gear 101 slidable on a key 102 fixed in the spindle, the pinion engaging a mating gear 103 on the end of a shaft 104 rotatable on an extension 105 of the bracket 28 and a corresponding extension 106 of the frame 16'.

The shaft 104 is driven by a gear 107 and an intermediate gear 108, meshing with the gear 91, as shown in Figures 4 and 8.

Longitudinal movement of the spindle 102 is accomplished by a recessed collar 109 in which operates a fork 110 on the end of a lever arm 111, pivoted at 112 to a projection of the bracket 113 bolted to the elements 26 and 28, the other arm 114 of the bell-crank lever being offset and actuated by a cam 115 on the cylinder 30.

Adjustably fixed on the drills 80 are facing tools 118, and as the advance of the drills and facers are controlled by cams, it will be clear that the drills are uniformly actuated, so that the work parts are drilled from three directions uniformly, simultaneously, and finally faced before the drills are caused to recede, during which time and operation the chuck is held stationary.

The operation of tapping is shown best in Figures 1 and 8 in which the taps 120 are actuated at the right and left hand and vertically below the work parts, held, at that time, in the lowermost jaw of the chuck.

The shaft 48, driven by the gear 47, operates partially within a sleeve 121 having on its outer projecting end a gear 122 meshing with an intermediate gear 123 driven by the wide faced gear 46, and on its inner end is loosely mounted a gear 124 having a clutch hub extending coincident with the end of the sleeve 121.

The inner projecting hub of the gear 124 is adapted to be engaged to the sleeve 121 by a double ended clutch 125 on the shaft 48, actuated by a forked lever 125' pivoted on an extension of the frame 16' and carrying a roller 126 operating in the cam groove 127 of the cam cylinder 31.

The other end of the clutch 125 is engageable with the hub of a gear 128 rotatably mounted on the shaft 48 adjacent a collar 129 fixed on the shaft and thus it will be seen that the gear 124 may be clutched to the sleeve 121 to rotate in one direction, while the gear 128 will be free to turn upon the shaft; conversely, when the clutch is moved in the opposite direction, the gear 128 will be clutched to the shaft to rotate with it in a direction opposite to the gear 124, which will idly turn upon the sleeve 121 when released from the clutch.

The tap at the left hand side of the machine, see Fig. 1, is held in a spindle 130, on which are fixed gears 131 and 132, the latter gear meshing with the gear 128 and the gear 131 with the gear 124 and the spindle 130 will be driven in accordance with the action of the cam 127 in the cylinder 31, thus rotating the spindle in a direction to urge the tap 120 into the work-part or cause it to back out, it being understood that the cam and shift gears are correctly proportioned for the work they are to do.

The spindle 130 is moved lengthwise by an arm 134 loosely held between collars 135 fixed on the spindle and carrying a roller 136 operating in the cam groove 137 of the cylinder 31, the arm being held from rotating with the spindle by a bar 138.

The gears 124 and 128 also mesh with gears 140 and 141 fixed on a shaft 143, the shaft being mounted at one end in the upright 16' and at its inner end in a part of the bracket 28.

A bevel gear 144 is fixed on the shaft 143 to drive a pinion 145 slidably keyed on a vertical spindle 146 and in which is secured the vertically disposed tap 120.

The spindle is moved up and down by a recessed sleeve 147 in which operates a fork formed on the end of a bell-crank lever arm 148 pivoted at 149 and having an upright arm 150 carrying a roller 151 actuated by a cam groove 152 in the cylinder 30.

The bevel pinion 145 also meshes with a mating gear 154 fixed on the inner end of a shaft 155, alining with the shaft 143 and housed in the bracket 26 and upright 16, this shaft carrying a gear 156 meshing with an intermediate 157 that is engaged with a gear 158 fixed on the end of a spindle 160 carrying the right hand tap 120.

The spindle 160 is moved lengthwise by an arm 161 between collars 162 and carries a roller 163 actuated by the cam groove 164 in the cylinder 30, the arm being guided by a bar 165 fixed in the adjacent bracket.

The construction of the spindles 130 and 160 and also the spindle 146 is substantially alike and shown in detail in Figure 10, in which the tap is illustrated as being floatingly held in the spindle to be positively driven in tapping or reversing direction and it is to be noted that the pressure of the cams is transmitted through an enclosed coiled compression spring 168, the tension of which may be adjusted by the screw 169, thereby avoiding stripping of threads and also eliminating the difficulty of producing and maintaining the high degree of accuracy otherwise required in constructing the cams.

As the machine is shown, a set of countersinking tools 180 are alined with the work-part openings at the upper part of the chuck, these countersinks being carried by spindles 181 and 182 at the respective ends of the machine and the vertical spindle 40, alined with the vertical tapping spindle 146.

The horizontal spindle 181 is driven direct by the gear 35 and moved endwise by the arm 185 held between collars 186 and actuated by the cam groove 187. The left hand spindle 182 is driven by the gear 44 and moved by the arm 188 operating between collars 189 actuated by the cam groove 190.

The upright spindle 40 is driven by the bevel pinion 39 and moved up and down by a recessed collar 192 in which operates a fork formed on the end of a bell-crank lever arm 193 pivoted at 194, the lever end carrying a roller 195 engaging the cam groove 196 in the cylinder 31.

From the foregoing it will be seen that the action of the machine is entirely automatic and continuous, the only manual labor required being to substitute a fresh work part for one fully machined, this being done while the several cutting tools are operating so that no loss of time is occasioned.

The foregoing disclosure is to be regarded as descriptive and illustrative only, and not as restrictive or limitative of the invention, of which obviously an embodiment may be constructed including many modifications without departing from the general scope herein indicated and denoted in the appended claims.

Having thus described my invention, what I claim as new and desire to secure by Letters Patent, is:—

1. In a pipe fitting finishing machine, a sectional shaft, a sleeve rotatable on one section of the shaft, geared connections between the sleeve and other shaft section, a multiple work holder fixed on the first named shaft section, geared means driven by the sleeve to partially rotate the first named shaft section and work holder intermittently, and means to lock the first named shaft section and workholder during the completion of the full rotation of the sleeve and other shaft section.

2. A pipe fitting finishing machine comprising a sectional shaft, a chuck mounted centrally therein having four pairs of jaws, cam cylinders on each side of said chuck, means for constantly rotating said cylinders, means for intermittently rotating the chuck in timed relation to the revolution of the cylinders, tool carrying spindles arranged in sets of three and directed towards the upper, rear and lower pairs of jaws, cams in said cylinders for advancing and retracting said spindles, and means for constantly rotating all of said spindles.

3. A pipe fitting finishing machine comprising a sectional shaft, a chuck mounted centrally therein having four pairs of jaws, cam cylinders on each side of said chuck, means for constantly rotating said cylinders, means for intermittently rotating the chuck in timed relation to the revolution of the cylinders, a set of three drill carrying spindles directed towards the center of one pair of chuck jaws, a set of three top carrying spindles directed towards the center of another pair of chuck jaws, a set of three countersink carrying spindles directed towards the center of the third pair of chuck jaws, cams in said cylinders for moving all of said spindles individually and in timed relation towards and from work parts held in the chuck jaws, a cam controlling the opening and closing of the fourth pair of chuck jaws, and means for rotating all of said spindles simultaneously.

In testimony whereof I have signed my name to this specification.

HARRY E. McKEE.